(12) United States Patent
Koloditsky

(10) Patent No.: US 11,679,604 B2
(45) Date of Patent: Jun. 20, 2023

(54) BUFFER UNIT

(71) Applicant: Hewlett-Packard Development Company, L.P., Spring, TX (US)

(72) Inventor: Yechiam Koloditsky, Nes Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 372 days.

(21) Appl. No.: 16/755,615

(22) PCT Filed: Dec. 13, 2017

(86) PCT No.: PCT/US2017/066201
§ 371 (c)(1),
(2) Date: Apr. 13, 2020

(87) PCT Pub. No.: WO2019/117897
PCT Pub. Date: Jun. 20, 2019

(65) Prior Publication Data
US 2020/0331280 A1 Oct. 22, 2020

(51) Int. Cl.
*B41J 11/44* (2006.01)
*B41J 11/42* (2006.01)
(Continued)

(52) U.S. Cl.
CPC .............. *B41J 11/44* (2013.01); *B41J 11/425* (2013.01); *B65H 43/04* (2013.01); *G06T 7/001* (2013.01);
(Continued)

(58) Field of Classification Search
CPC ......... B41J 11/44; B41J 11/425; B65H 43/04; B65H 2801/15; B65H 2301/4213; G06T 7/001
See application file for complete search history.

(56) References Cited

U.S. PATENT DOCUMENTS 4,317,203 A * 2/1982 Botte .................... G06K 13/067
700/223
5,547,177 A * 8/1996 Merkli .................... B65H 39/04
270/52.05
(Continued)

FOREIGN PATENT DOCUMENTS

WO WO-2017005749 1/2017

OTHER PUBLICATIONS

Apollo 30k, Jun. 27, 2016, http://www.avt-inc.com/solutions/solutions-for-digital-hp-indigo-presses/apollo-30000/.
(Continued)

*Primary Examiner* — David H Banh

(57) ABSTRACT

Certain examples described herein relate to a buffer unit for a printing system. In certain cases, a measurement device is used to obtain measurement data representing an optical property of a printed image on a substrate. A buffer unit receives the substrate downstream of the measurement device and places the substrate in a queue. In certain cases, a controller determines, based on the measurement data, whether the printed image comprises a defect. Responsive to determining that the printed image does not comprise a defect, the controller causes the substrate to be moved from the buffer unit to an output stack. Responsive to determining that the printed image comprises a defect, the controller causes the substrate to not be moved to the output stack.

13 Claims, 6 Drawing Sheets

(51) Int. Cl.
  *B65H 43/04* (2006.01)
  *G06T 7/00* (2017.01)

(52) U.S. Cl.
  CPC .. *B65H 2301/4213* (2013.01); *B65H 2801/15* (2013.01)

(56) References Cited

U.S. PATENT DOCUMENTS

| | | | |
|---|---|---|---|
| 7,519,222 | B2 | 4/2009 | Kisilev et al. |
| 9,131,187 | B2 | 9/2015 | Shijoh |
| 2004/0066526 | A1* | 4/2004 | Inoo .................. G03G 15/502 358/1.14 |
| 2005/0168767 | A1* | 8/2005 | Moroney ............. G06K 15/00 358/1.14 |
| 2007/0024664 | A1 | 2/2007 | Shang et al. |
| 2008/0229940 | A1* | 9/2008 | Levin ................. G03G 15/5012 101/2 |
| 2009/0226232 | A1 | 9/2009 | Scholzig |
| 2010/0277525 | A1 | 11/2010 | Sender et al. |
| 2015/0130829 | A1 | 5/2015 | Aizaki et al. |
| 2015/0131116 | A1* | 5/2015 | Sochi ................. H04N 1/00045 358/1.14 |
| 2016/0229198 | A1* | 8/2016 | Izume .................... B41F 17/22 |
| 2018/0157446 | A1* | 6/2018 | Fukuda ................. G06K 15/16 |
| 2018/0170077 | A1* | 6/2018 | Nistor ................... B65H 29/12 |
| 2020/0013158 | A1* | 1/2020 | Asai ..................... G06T 7/0002 |

OTHER PUBLICATIONS

Sarma, D., et al., Interest for Interpack 2017 Rises to Fever Pitch, Mar. 31, 2017, http://www.printweek.in/features/interpack-2017-rises-fever-pitch-24159.

\* cited by examiner

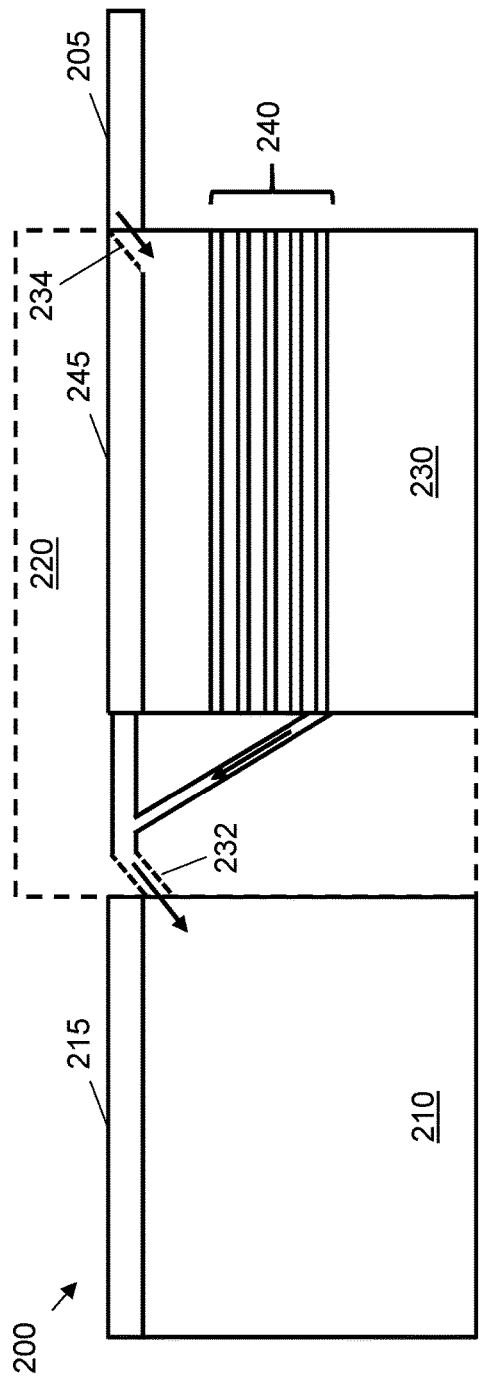
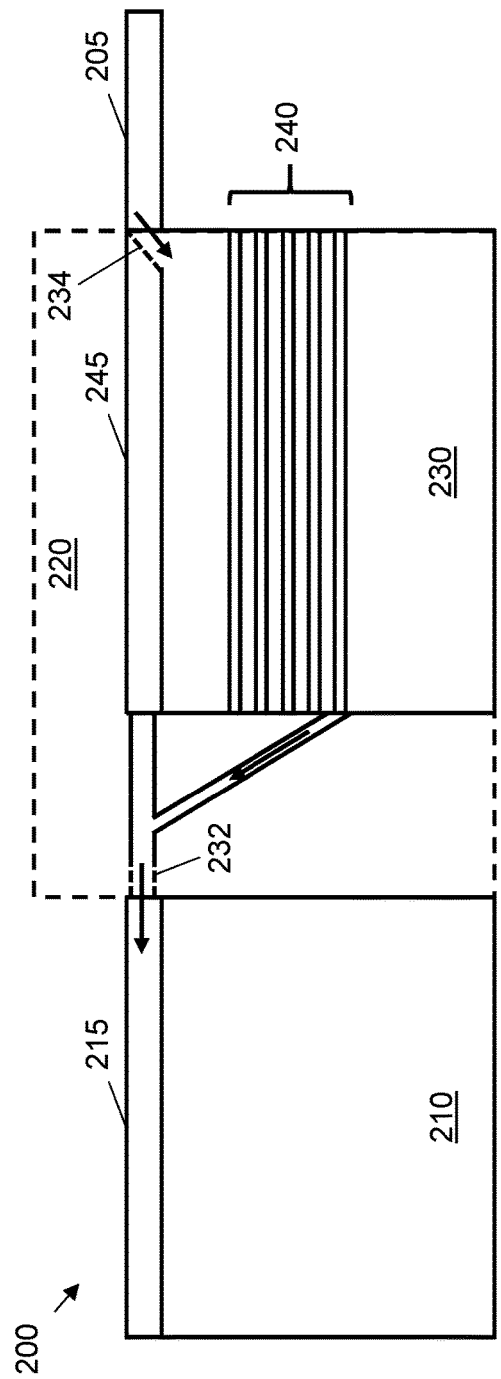
Fig. 2A
Fig. 2B

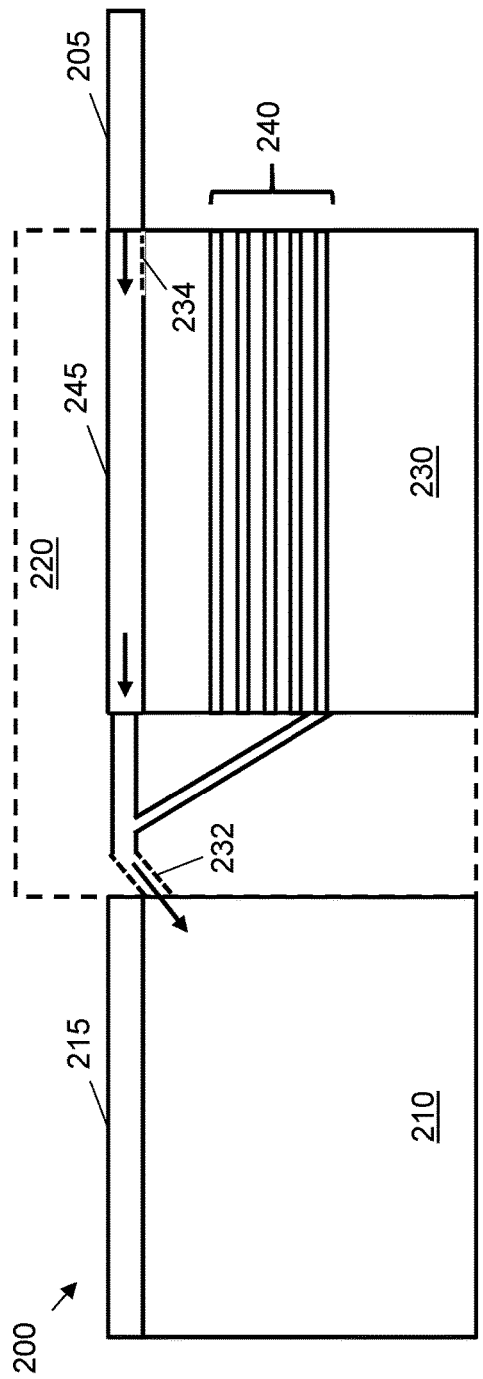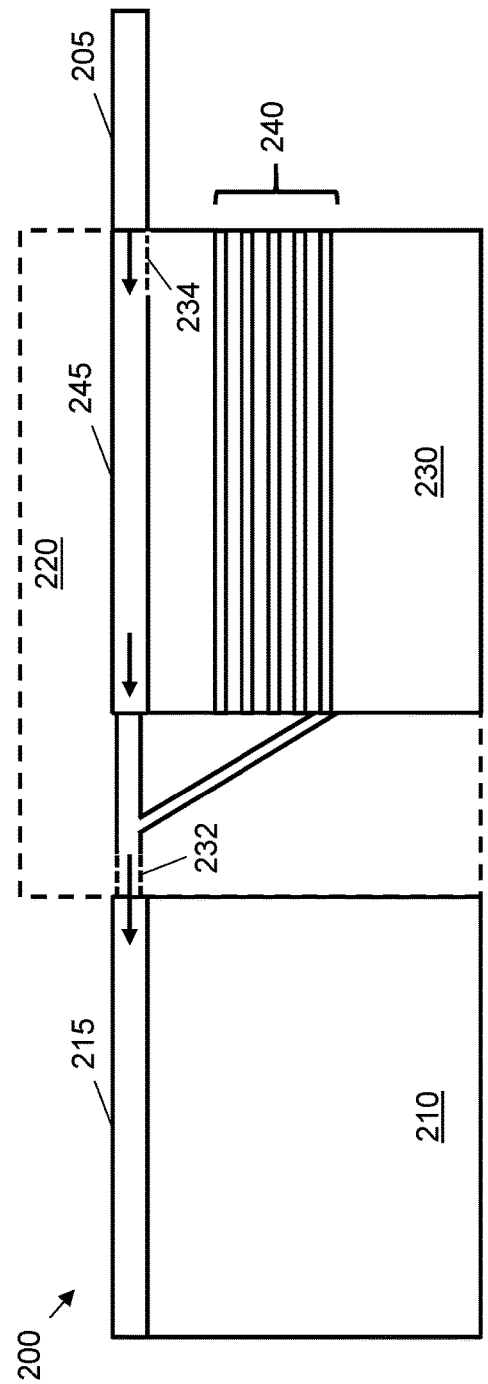
*Fig. 2C*
*Fig. 2D*

BUFFER UNIT

BACKGROUND

A printing system may process a digital input file and print an image onto a substrate. A variable data printing (VDP) operation may comprise printing a sequence of images, where at least some of the images are different from each other. Some printed images may comprise different optical properties than desired.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein:

FIG. 2A is a schematic diagram of a part of a printing system in a first configuration according to an example;

FIG. 2B is a schematic diagram of a part of a printing system in a second configuration according to an example;

FIG. 2C is a schematic diagram of a part of a printing system in a third configuration according to an example;

FIG. 2D is a schematic diagram of a part of a printing system in a fourth configuration according to an example;

DETAILED DESCRIPTION

Figure 1:
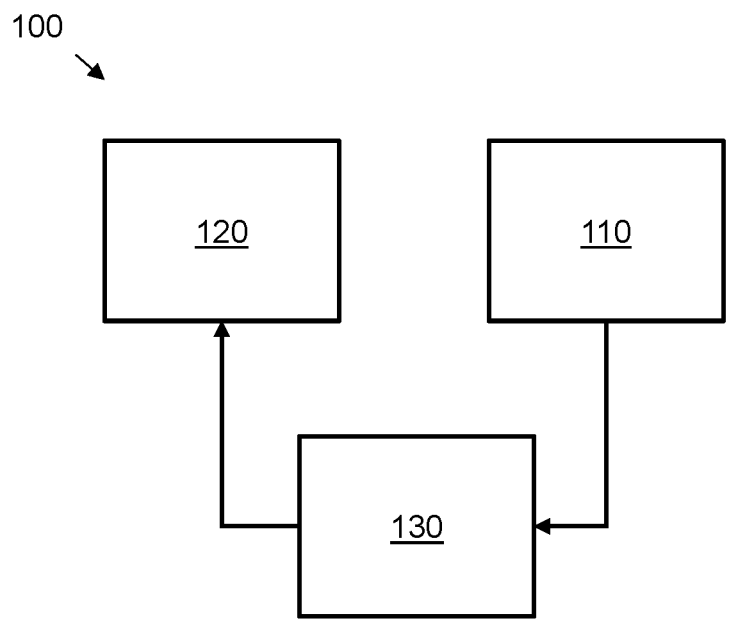
FIG. 1 is a schematic diagram of an apparatus according to an example.

A printed image may deviate from a desired or intended printed output. Such a deviation may be considered as a defect or irregularity in the printed image. Printed images that comprise defects may be unusable or of undesirably low visual quality. In some cases, printing systems can use an inspection system to inspect a printed image on a substrate, after the printed image has been printed onto the substrate, and detect the occurrence of a defect in the printed image. For example, the inspection system may scan the printed image and compare the scanned image to a digital image file used as a reference. Re-printing of the defective image may be performed as a result of the defect detection. In some cases, the processes of analyzing the scanned image and/or comparing the scanned image to the digital image file takes an amount of time. This may cause a delay relative to the rate at which images are printed by the printing system. For example, a printing system may be arranged to print a sequence of images on a corresponding sequence of substrates at a rate of approximately one printed image per second. However, a defect detection system may be able to inspect the sequence of printed images at a slower rate, for example approximately one printed image every three seconds. As such, by the time a defect in a given printed image is detected, the substrate comprising the defective image may already be on an output stack underneath one or more other substrates comprising subsequently-printed images.

A VDP operation may comprise printing a sequence of images, where at least some of the images are different from each other. The sequence of images in a VDP job may be in a particular pre-configured order for processing and/or printing.

In some cases, when a defect is detected in a given printed image, an indication is generated such that an operator is notified which substrate comprises the defective image. The operator may then find that substrate amongst other substrates in the output stack and remove the substrate from the output stack. The defective image may be re-printed on a further substrate, which the operator may then place in the relevant position in the output stack, for example between other substrates, in order to maintain the original order of printed images in the output stack. Such a process may involve an undesirable amount of operator time and/or effort.

In other cases, when a defect is detected in a given printed image, an ongoing print job may be interrupted, thus involving printer downtime. An operator may remove the uppermost substrates from the output stack, the uppermost substrates comprising the substrate having the defective image and one or more other substrates comprising subsequently-printed, non-defective images. The operator may then resume the interrupted print job, which is set back to re-print the images from the removed uppermost substrates. As such, non-defective images may be re-printed as well as the defective image, resulting in wastage of print materials.

FIG. 1 shows an apparatus 100 according to an example. The apparatus 100 may be comprised in a printing system, for example a digital press printer. An example of a digital press printer is a digital offset press printer, for example a Liquid Electro-Photographic (LEP) printer. A digital offset printer works by using digitally controlled lasers or LED imaging modules to create a latent image on the charged surface of a photo-imaging cylinder. The lasers are controlled according to digital instructions from a digital image file to create an electrostatic image on the charged photo-imaging cylinder. Ink is then applied to the selectively discharged surface of the photo-imaging cylinder. Ink is then transferred onto the photo-imaging cylinder, creating an inked image. The inked image is then transferred from the photo-imaging cylinder to a heated blanket cylinder, where heating evaporates a liquid vehicle from the ink, and finally from the blanket cylinder to a print medium. In some examples, the apparatus 100 is arranged separately from a printing system. A "printer" or "printing system as described herein may comprise any device suitable for performing an additive manufacturing process, which may include, but not be limited to, systems for additive manufacturing in two-dimensions and/or three-dimensions.

The apparatus 100 comprises a measurement device 110. The measurement device 110 is to obtain measurement data representing an optical property of a printed image on a substrate. The measurement device 110 may be arranged to measure such an optical property to obtain the measurement data. Examples of optical properties include, but are not limited to, colorimetric properties, brightness, reflectance and transparency. The optical property may correspond to some or all of the printed image. The measurement device 110 may comprise a sensor. In an example, the measurement device 110 comprises a scanner. The scanner may comprise an in-line scanner. In an example, the measurement device 110 comprises a photo-electric sensor. The measurement device 110 may also include sensors of differing types. In some examples, the measurement device 110 is arranged to measure a property of the substrate comprising the printed image. For example, the measurement device 110 may be arranged to detect a tear or splice in the substrate.

Different types of substrate or print media may be used in the apparatus 100. Examples of types of substrate include, but are not limited to, papers, synthetics, films, foils, fabrics, flexible cardboard and flexible paperboard.

In some examples, the apparatus 100 comprises a printing mechanism. The printing mechanism may be arranged to generate the printed image on the substrate. The printed image may be generated based on a digital image file received and/or processed by the printing mechanism. In some examples, the printing mechanism comprises a VDP mechanism. In other examples, the printing mechanism comprise a non-variable printing mechanism.

The printing mechanism may be arranged upstream of the measurement device, for example as part of a printing pipeline. As such, the measurement device 110 may be arranged to inspect the printed image when the substrate is received from the printing mechanism, after the printed image is generated on the substrate by the printing mechanism.

In some examples, the apparatus 100 comprises a media transport system (not shown). The media transport system may be configured to convey print media through different stages of the printing pipeline. The media transport system may comprise an arrangement of one or more belts and/or one or more rollers to transport the substrate. These belts and/or rollers may be driven by a drive mechanism, e.g. one or more electromechanical motors. The media transport system may be arranged to transport the substrate from the printing mechanism to the measurement device 110.

The apparatus 100 also comprises a buffer unit 120. The buffer unit 120 is to receive the substrate downstream of the measurement device 110. As such, the buffer unit 120 is arranged to receive the substrate after the substrate is inspected by the measurement device 110. The buffer unit 120 may be arranged to receive the substrate via the media transport system. The buffer unit 120 is arranged between the measurement device 110 and an output stack.

The buffer unit 120 is to place the substrate in a queue. The queue may be comprised in the buffer unit 120. The queue may comprise a plurality of substrates. The plurality of substrates in the queue may be arranged in a pre-configured order. In some examples, the pre-configured order corresponds to an order in which the substrates are received by the buffer unit 120. In some examples, the pre-configured order corresponds to a printing order in which images are printed onto the substrates. The queue may have a "first-in-first-out" arrangement, wherein substrates leave the queue in the same order in which they join the queue. Placing the substrate in a queue may temporarily prevent the substrate from leaving the buffer unit 120.

The apparatus 100 also comprises a controller 130. In some examples, the controller 130 is communicatively coupled to the measurement device 110. In some examples, the controller 130 is communicatively coupled to the buffer unit 120. The controller 130 may additionally or alternatively be communicatively coupled to the printing mechanism and/or the media transport system. The controller 130 may comprise control electronics to control one or more components of the apparatus 100 using generated control signals. The controller 130 may comprise a print processor. The controller may comprise a central processing unit of an embedded computing device, a microprocessor, a suitably-programmed Field Programmable Gate Array (FPGA) and/or an Application-Specific Integrated Circuit. The controller 130 may obtain instructions from an integrated or separate memory, which may be volatile and/or non-volatile, e.g. instructions may be retrieved from an erasable programmable read-only memory and loaded into a processor cache.

The controller 130 is to determine, based on the measurement data obtained by the measurement device 110, whether the printed image on the substrate comprises a defect. In some examples, the measurement data is analyzed and compared to reference data. For a given image, the reference data may comprise a digital image file used as an input for the printing mechanism when printing the given image. As such, the controller 130 may determine an extent to which the measurement data deviates from the digital image file. The determination of whether the printed image comprises a defect may be based on a determination of whether, based on the measurement data, the printed image deviates from the digital image file by a predetermined amount. Other types of reference data may be used in other examples. For example, the reference data may comprise one or more threshold values or ranges against which the measurement data can be compared. In an example, different types of defect may be detected through use of different types of measurement data. In some examples, the measurement data is compared to measurement data for one or more other printed images. For example, where a plurality of printed images on different substrates are based on the same digital image file, the measurement data for one such printed image may be compared to measurement data for another such printed image. In an example, the measurement data is compared to an average of measurement data for a plurality of previously printed images.

In some examples, the controller 130 receives the measurement data from the measurement device 110 and analyzes the measurement data to determine whether the printed image is defective. In other examples, the measurement device 110 uses the measurement data to determine whether the printed image is defective, and indicates to the controller 130 the result of said determination. As such, the controller 130 may determine whether the printed image comprises a defect based on the measurement data directly, i.e. by the controller 130 analyzing the measurement data, or indirectly, i.e. by the measurement device 110 analyzing the measurement data.

The controller 130 is arranged to control the path of the substrate downstream of the buffer unit 120. The controller 130 may be arranged to control the path of the substrate by generating control signals for the media transport system and/or the buffer unit 120.

Responsive to determining that the printed image does not comprise a defect, the controller 130 is to cause the substrate to be moved from the buffer unit 120 to an output stack. The output stack is arranged downstream of the buffer unit 120. The output stack may be arranged in a stacker. In some examples, the output stack is part of the printing system. Substrates may be placed in the output stack for further processing, storage, packaging, delivery or the like.

Responsive to determining that the printed image comprises a defect, the controller 130 is to cause the substrate to not be moved to the output stack. In an example, responsive to determining that the printed image comprises a defect, the controller 130 is to cause the substrate to bypass the output stack. By bypassing the output stack, the substrate may be moved to a location other than that of the output stack. For example, the substrate may be moved to a further stack. Substrates may be placed in the further stack for recycling, discarding, further processing, quality control analysis or the like. Therefore, the buffer unit 120 and controller 130 may be used to sort substrates into the output stack and the further stack. In some examples, the further stack is separate from the buffer unit 120. In other examples, the further stack is comprised in the buffer unit 120. In some examples, the substrate comprising the defective image is ejected from the printing system.

In some examples, responsive to determining that the printed image comprises a defect, the controller 130 is to output a control signal to the printing mechanism. The control signal causes the printing mechanism to re-print the printed image. The image may be re-printed on a further substrate.

In some examples, the apparatus 100 comprises a buffer bypass (not shown). The buffer bypass is to receive the further substrate comprising the re-printed image. The buffer bypass may be arranged in parallel with the queue to allow the further substrate to bypass the queue. As such, the further substrate may be given priority over the other substrates in the queue.

In some examples, the controller 130 is configured to determine whether the re-printed image comprises a defect. Responsive to determining that the re-printed image does not comprise a defect, the controller 130 may cause the further substrate to be moved from the buffer bypass to the output stack. Responsive to determining that the re-printed image comprises a defect, the controller 130 may cause the further substrate to not be moved to the output stack. For example, the controller 130 may cause the further substrate to bypass the output stack.

FIGS. 2A to 2D show a part of a printing system 200 in a first, second, third and fourth configuration respectively. The printing system 200 may comprise additional components to those shown in FIGS. 2A to 2D.

The printing system 200 comprises a bridge 205. The bridge 205 may connect a printing mechanism with one or more components that are downstream of the printing mechanism. In some examples, the bridge 205 comprises a measurement device, such as the measurement device 110 of FIG. 1. In other examples, the measurement device is arranged upstream of the bridge 205.

The printing system 200 also comprises an output stack 210, an output stack bypass 215, and a buffer unit 220. The buffer unit 220 is arranged upstream of the output stack 210 and the output stack bypass 215.

The buffer unit 220 comprises a media retainer 230. The media retainer 230 may comprise a stacker or other module configured to hold print media. The buffer unit 220 also comprises a downstream diverter 232. The downstream diverter 232 is to control a media path downstream of the media retainer 230. The downstream diverter 232 may have at least two different configurations or positions to provide at least two different media paths downstream of the media retainer 230. In an example, the downstream diverter 232 is mechanically actuable between the at least two configurations in response to control signals, for example from the controller 130 of FIG. 1.

In this example, the buffer unit 220 also comprises an upstream diverter 234. The upstream diverter 234 is to control a media path upstream of the media retainer 230. The upstream diverter 234 may have at least two different configurations or positions to provide at least two different media paths upstream of the media retainer 230. In an example, the upstream diverter 234 is mechanically actuable between the at least two configurations in response to control signals, for example from the controller 130 of FIG. 1. In some examples, the buffer unit 220 does not comprise an upstream diverter.

As shown in FIG. 2A, a first print medium comprising a printed image may be received by the media retainer 230 via the bridge 205. The first print medium is directed into the media retainer 230 by the upstream diverter 234. The upstream diverter 234 may be configured in a first configuration or position to divert the first print medium into the media retainer 230. The media retainer 230 is to hold the received print medium in a queue 240. In this example, the queue 240 comprises a plurality of print media maintained in a predetermined order.

When the first print medium reaches the front of the queue 240, a signal may be received indicating that the printed image on the first print medium is not defective. The signal may be received from a print controller, for example. In response to receipt of said signal, the first print medium may be moved from the media retainer 230 to the downstream diverter 232 which diverts the first print medium into the output stack 210. The downstream diverter 232 may be configured in a first configuration or position to divert the first print medium into the output stack 210. In some examples, rather than a signal being received that indicates that the printed image is not defective, the first print medium is moved to the output stack 210 due to an absence of receipt of a signal indicating that the printed image is defective.

As shown in FIG. 2B, if a signal is received indicating that the printed image on the first print medium is defective, the first print medium may be moved from the media retainer 230 to the downstream diverter 232. In this case, the downstream diverter 232 diverts the first print medium away from the output stack 210 and into the output stack bypass 215. The downstream diverter 232 may be configured in a second configuration or position to divert the first print medium away from the output stack 210. The output stack bypass 215 may lead, for example, to a further stack or to a waste disposal unit (not shown). In some examples, rather than a signal being received that indicates that the printed image is defective, the first print medium is diverted away from the output stack 210 due to an absence of receipt of a signal causing different behaviour. For example, the first print medium may be diverted away from the output stack 210 due to an absence of receipt of a signal indicating that the printed image is not defective.

As shown in FIG. 2C, a second print medium comprising a re-printed image may be received via the bridge 205 and diverted away from the media retainer 230 by the upstream diverter 234. The re-printed image is a re-printed version of the defective image. The upstream diverter 234 may be configured in a second configuration or position to divert the second print medium away from the media retainer 230. As such, the second print medium is not placed at the back of the queue 240. The second print medium may be held in buffer bypass 245. The buffer bypass 245 may be separate from the media retainer 230. In some examples, the second print medium is held on the bridge 205. In response to a determination that the re-printed image is not defective, the second print medium is diverted to the output stack 210 by the downstream diverter 232.

As shown in FIG. 2D, if is determined that the re-printed image is defective, the second print medium is diverted away from the output stack 210 by the downstream diverter 232, for example into the output stack bypass 215.

Figure 3:
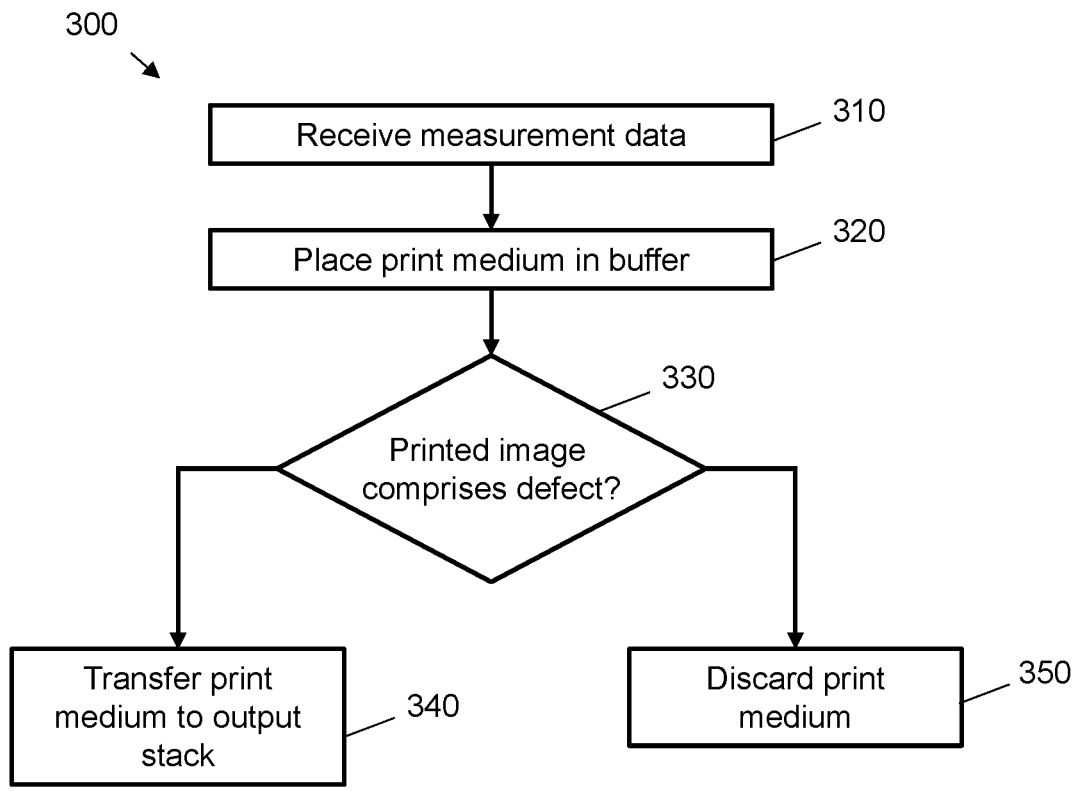
FIG. 3 is a flow chart illustrating a method according to an example.

FIG. 3 shows a method 300 according to an example. In some examples, the method 300 is co-ordinated by a processor of a printing system. The processor may co-ordinate or control the method based on instructions retrieved from a computer-readable storage medium. Co-ordinating the method may involve the processor generating control signals. The printing system may comprise printing system 200.

At item 310, measurement data is received from a sensor. The measurement data indicates a measured property of a printed image on a print medium.

At item 320, the print medium is placed in a buffer downstream of the sensor. The buffer comprises a plurality of further print media held in a queue.

At item 330, it is determined whether the printed image comprises a defect, based on the measurement data.

Responsive to determining at item 330 that the printed image does not comprise a defect, the print medium is transferred at item 340 from the buffer to an output stack. The print medium may be transferred to the output stack via one or more print medium diverters.

Responsive to determining at item 330 that the printed image comprises a defect, the print medium is discarded at item 350. Discarding the first print medium may comprise ejecting the print medium from the printing system. In some examples, discarding the print medium comprises causing the print medium to bypass the output stack. In some examples, discarding the print medium comprising diverting the print medium away from the output stack.

As such, the print medium may be held in the buffer until a determination is made on whether or not the printed image comprises a defect. Such a determination may occur at a different time than the time at which the measurement data is obtained by the sensor. The print medium may therefore be held in the buffer during a time period between the inspection of the printed image by the sensor and the determination of whether the printed image comprises a defect.

Figure 4:
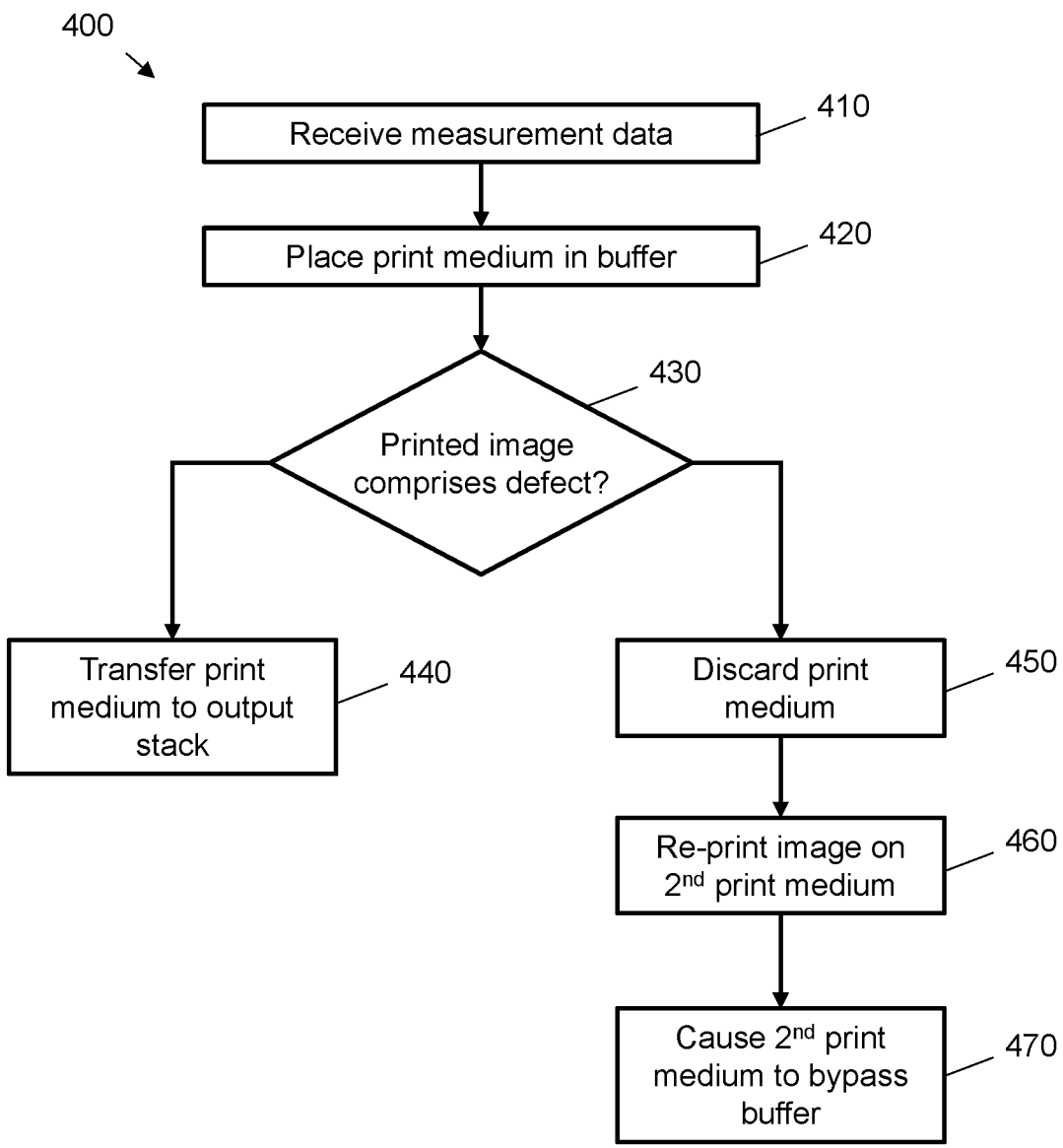
FIG. 4 is a flow chart illustrating a method according to an example.

FIG. 4 shows a method 400 according to an example. In some examples, the method 400 is co-ordinated by a processor of a printing system. The processor may co-ordinate the method based on instructions retrieved from a computer-readable storage medium. The printing system may comprise printing system 200.

At item 410, measurement data is received from a sensor, the measurement data indicating a measured property of a printed image on a first print medium.

At item 420, the first print medium is placed in a buffer downstream of the sensor, the buffer comprising a plurality of further print media held in a queue.

At item 430, it is determined whether the printed image comprises a defect, based on the measurement data.

Responsive to determining at item 430 that the printed image does not comprise a defect, the first print medium is transferred at item 440 from the buffer to an output stack.

Responsive to determining at item 430 that the printed image comprises a defect, the first print medium is discarded at item 450.

At item 460, responsive to determining that the printed image comprises a defect, a control signal is output to a printing mechanism to cause the printing mechanism to re-print the printed image on a second print medium.

At item 470, the second print medium comprising the re-printed image bypasses the buffer. In some examples, the second print medium is placed at the front of the queue. In such examples, the second print medium does not bypass the buffer altogether, but is not held behind the further print media in the queue.

In some examples, further measurement data is received from the sensor. The further measurement data indicates a measured property of the re-printed image. In some examples, it is determined whether the re-printed image comprises a defect, based on the further measurement data. For example, the further measurement data may be compared to digital input data for the image. Responsive to determining that the re-printed image does not comprise a defect, the second print medium may be transported to the output stack. Responsive to determining that the re-printed image comprises a defect, the second print medium may be discarded.

In some examples, if it is determined that the re-printed image comprises a defect, a further control signal is output to the printing mechanism to re-print the image onto a third print medium. In some examples, if it is determined that the re-printed image on the second print medium comprises a defect, an alert is generated. In some examples, if it is determined that the re-printed image on the second print medium comprises a defect, a control signal is generated to interrupt a print job performed by the printing system.

In some examples, the further print media are prevented from leaving the buffer until a determination is made on whether the re-printed image comprises a defect. In an example, the further print media are held in the queue until such a determination is made. In another example, the further print media are not held in the queue but are held in the buffer.

In some examples, a control signal is output to the printing mechanism to defer printing of a further image until a determination is made on whether the re-printed image comprises a defect. In such examples, no further images are printed by the printing mechanism until the defect determination is made for the re-printed image.

Figure 5:
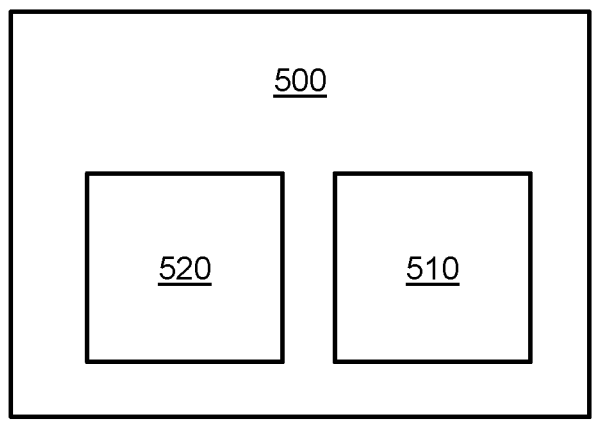
FIG. 5 is a schematic diagram of a buffer unit according to an example.

FIG. 5 shows a buffer unit 500 according to an example. The buffer unit 500 is useable with a printing system such as printing system 200 described above. The buffer unit 500 is useable to sort print media comprising printed images into one or more stacks.

The buffer unit 500 is to receive items of print media, and signals indicating whether respective items of print media are defective or not, from a printing system.

The buffer unit 500 comprises a media retainer 510 to receive a print medium comprising a printed image and hold the print medium in a queue. In some examples, the media retainer 510 is operable to hold a plurality of print media in the queue in a pre-configured order.

The buffer unit 500 also comprises a diverter 520 to control a media path downstream of the media retainer 510. The diverter 520 may be configured to guide the print medium along one or more media paths.

The diverter 520 is controllable to, if the printed image is defective, cause the print medium to bypass an output stack. The diverter 520 may cause the printed medium to bypass the output stack in response to receiving a signal indicating that the printed image is defective. In an example, the print medium is directed by diverter 520 to a further stack, separate from the output stack.

The diverter 520 is further controllable to, if the printed image is not defective, direct the print medium to the output stack. In some examples, the diverter 520 is configured to direct the print medium to the output stack in response to receipt of a signal indicating that the printed image is not defective.

In some examples, the buffer unit 500 comprises a further diverter (not shown) to control a media path upstream of the media retainer 510. The further diverter is configured to cause a further print medium comprising a re-printed image to bypass the media retainer 510. The re-printed image corresponds to the defective printed image.

Certain examples described herein may implemented and/or controlled by a processor, for example a processor of a printing system. Such a processor may be connectably coupled to a computer-readable storage medium comprising a set of computer-readable instructions stored thereon, which may be executed by the processor.

The processor can include a microprocessor, microcontroller, processor module or subsystem, programmable integrated circuit, programmable gate array, or another control or computing device. The computer-readable storage medium can be implemented as one or multiple computer-readable storage media. The computer-readable storage medium includes different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. The computer-readable instructions can be stored on one computer-readable storage medium, or alternatively, can be stored on multiple computer-readable storage media. The computer-readable storage medium or media can be located either in the printing system or located at a remote site from which computer-readable instructions can be downloaded over a network for execution by the processor.

Certain examples described herein enable substrates to be selectively moved to an output stack based on a determination of whether an image printed on a given substrate comprises a defect. A buffer unit is used to prevent substrates from being placed on the output stack until a determination is made that those substrates do not comprise defective images. Therefore, at the end of a print job which may comprise printing a sequence of images in a pre-configured order, the output stack may not include any substrates which comprise defective images.

Certain examples described herein enable an amount of operator interference in a printing system to be reduced. Since substrates comprising defective images are not added to the output stack, e.g. being diverted away from the output stack instead, retrieval and/or removal of such substrates from the output stack by an operator may not be performed.

Certain examples described herein enable an amount of waste produced in a print job to be reduced. Substrates upon which defective images are printed may not be placed on the output stack underneath other substrates upon which non-defective images are printed. As such, substrates comprising non-defective images may not be discarded and re-printing of the non-defective images may not be performed, thereby reducing wastage of print materials.

Certain examples described herein enable a pre-configured order of a sequence of images in a print job to be maintained. Maintaining the pre-configured order may be desirable in VDP jobs. If the pre-configured order of a VDP sequence is not maintained, re-printing of the entire sequence of images may be performed. When a defect is detected for an image on a given substrate, other substrates comprising subsequent images in the sequence are held in the buffer unit until the defective image is re-printed, re-analyzed, and placed in the output stack if it is determined that the re-printed image is non-defective. The substrate comprising the re-printed image may bypass the buffer unit entirely or may at least be placed at the front of the queue within the buffer unit. As such, the pre-configured order of the image sequence is maintained.

Certain examples described herein enable an amount of printer downtime to be reduced. Print media comprising defective images may be discarded via the diverter of the buffer unit without interruption of a print job and/or operator interaction.

Certain examples described herein enable defect detection of printed images to be performed with a high degree of accuracy. The buffer unit downstream of the measurement device allows substrates to be held in a queue until a determination is made on whether the substrates comprise defective images. The determination may be based on image inspection and/or analysis. Reducing the time taken for such analysis may result in a reduction of accuracy in defect detection. Therefore, by holding the substrates in the buffer unit instead of reducing the time taken for the analysis, a high level of accuracy in defect detection may be maintained.

The preceding description has been presented to illustrate and describe examples of the principles described. This description is not intended to be exhaustive or to limit these principles to any precise form disclosed. Many modifications and variations are possible in light of the above teaching.

What is claimed is:

1. An apparatus comprising:
   a measurement device to obtain measurement data representing an optical property of a printed image on a first substrate;
   a buffer unit to receive the first substrate downstream of the measurement device and place the first substrate in a queue; and
   a controller to:
      determine, based on the measurement data, whether the printed image comprises a defect;
      responsive to determining that the printed image does not comprise a defect, cause the first substrate to be moved from the buffer unit to an output stack; and
      responsive to determining that the printed image comprises a defect, cause the first substrate to not be moved to the output stack.

2. The apparatus of claim 1, wherein the buffer unit is operable to hold a plurality of substrates in the queue in a pre-configured order.

3. The apparatus of claim 1, comprising a printing mechanism upstream of the measurement device to generate the printed image on the first substrate, wherein the printing mechanism is a variable-data printing mechanism.

4. The apparatus of claim 1, wherein, responsive to determining that the printed image comprises a defect, the controller is to output a control signal to a printing mechanism to cause the printing mechanism to re-print the printed image on a second substrate; and
   comprising a buffer bypass to receive the second substrate, the buffer bypass arranged in parallel with the queue to allow the second substrate to bypass the queue,
   wherein the controller is to:
      determine whether the re-printed image comprises a defect;
      responsive to determining that the re-printed image does not comprise a defect,
      cause the second substrate to be moved from the buffer bypass to the output stack; and
      responsive to determining that the re-printed image comprises a defect, cause the second substrate to not be moved to the output stack.

5. A method comprising:
receiving measurement data from a sensor, the measurement data indicating a measured property of a printed image on a first print medium;
placing the first print medium in a buffer downstream of the sensor, the buffer comprising a plurality of further print media held in a queue;
determining, based on the measurement data, whether the printed image comprises a defect;
responsive to determining that the printed image does not comprise a defect, transferring the first print medium from the buffer to an output stack; and
responsive to determining that the printed image comprises a defect, discarding the first print medium.

6. The method of claim 5, comprising, responsive to determining that the printed image comprises a defect, outputting a control signal to a printing mechanism to cause the printing mechanism to re-print the printed image on a second print medium.

7. The method of claim 6, comprising placing the second print medium comprising the re-printed image at the front of the queue.

8. The method of claim 6, comprising causing the second print medium comprising the re-printed image to bypass the buffer.

9. The method of claim 6, comprising preventing the further plurality of print media from leaving the buffer until a determination is made on whether the re-printed image comprises a defect.

10. The method of claim 6, comprising outputting a control signal to the printing mechanism to defer printing of a further image until a determination is made on whether the re-printed image comprises a defect.

11. The method of claim 6, comprising:
receiving further measurement data from the sensor, the further measurement data indicating a measured property of the re-printed image;
determining, based on the further measurement data, whether the re-printed image comprises a defect;
responsive to determining that the re-printed image does not comprise a defect, transporting the second print medium to the output stack; and
responsive to determining that the re-printed image comprises a defect, discarding the second print medium.

12. A buffer unit to receive items of print media, and signals indicating whether respective items of print media are defective or not, from a printing system, the buffer unit comprising:
a media retainer to receive a first print medium comprising a printed image and hold the first print medium in a queue; and
a first diverter to control a media path downstream of the media retainer, the first diverter being controllable to:
if the printed image is defective, cause the first print medium to bypass an output stack; and
if the printed image is not defective, direct the first print medium to the output stack; and
a second diverter to control a media path upstream of the media retainer, the second diverter being configured to cause a second print medium comprising a re-printed image to bypass the media retainer and direct the second print medium to the first diverter, the re-printed image corresponding to a defective printed image.

13. The buffer unit of claim 12, wherein the media retainer is operable to hold a plurality of print media in the queue in a pre-configured order.

* * * * *